May 31, 1966  L. ROSS ETAL  3,253,534
COFFEE BREWING MACHINE
Filed July 19, 1963  3 Sheets-Sheet 2
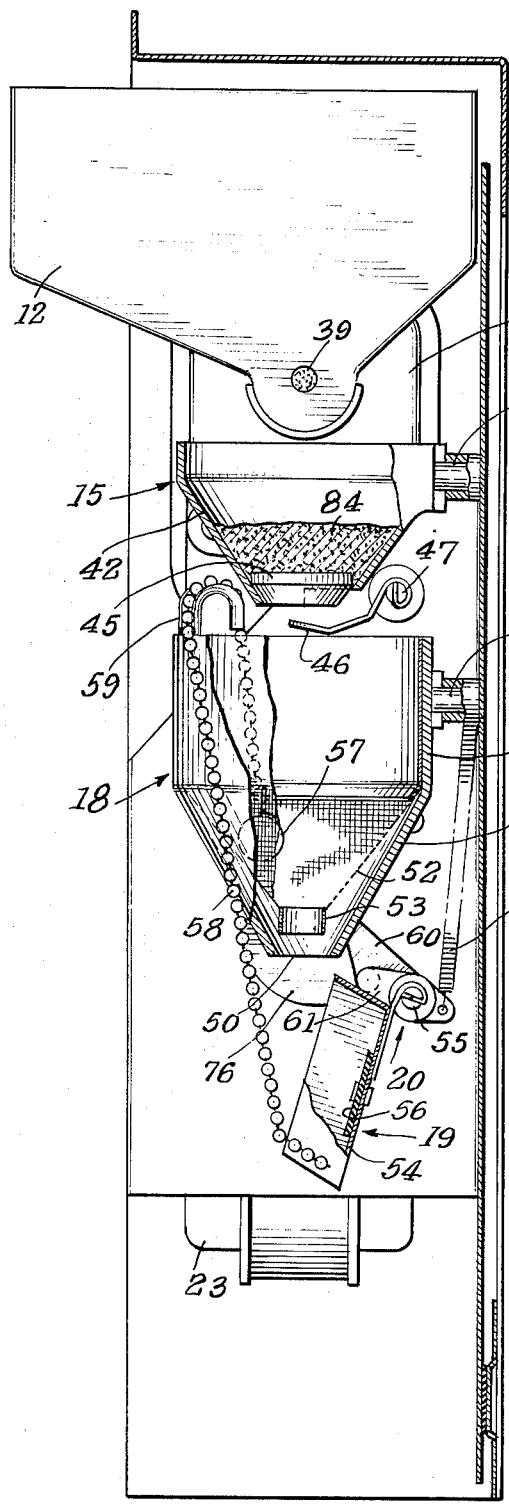
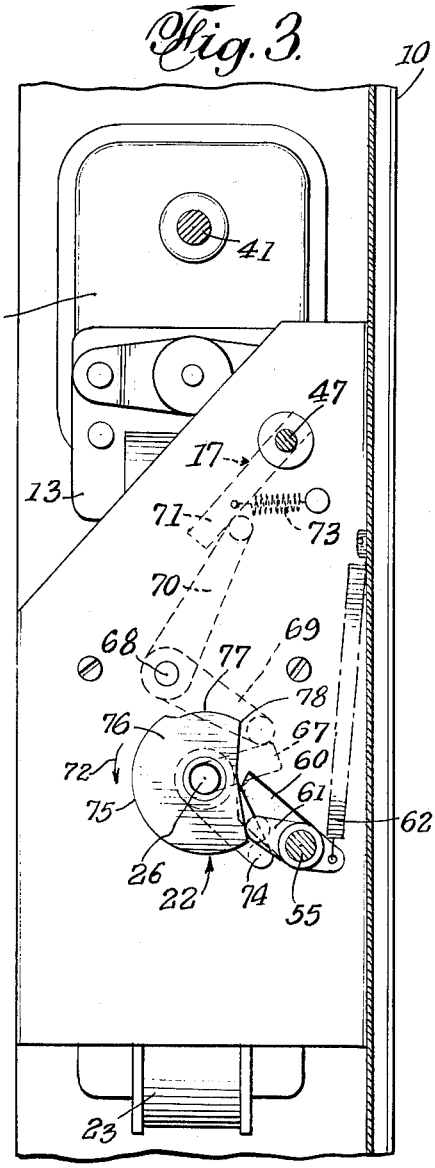
INVENTORS
LEONARD ROSS
ROBERT A. WEGRZYNEK
BY
C. G. Stratton
ATTORNEY

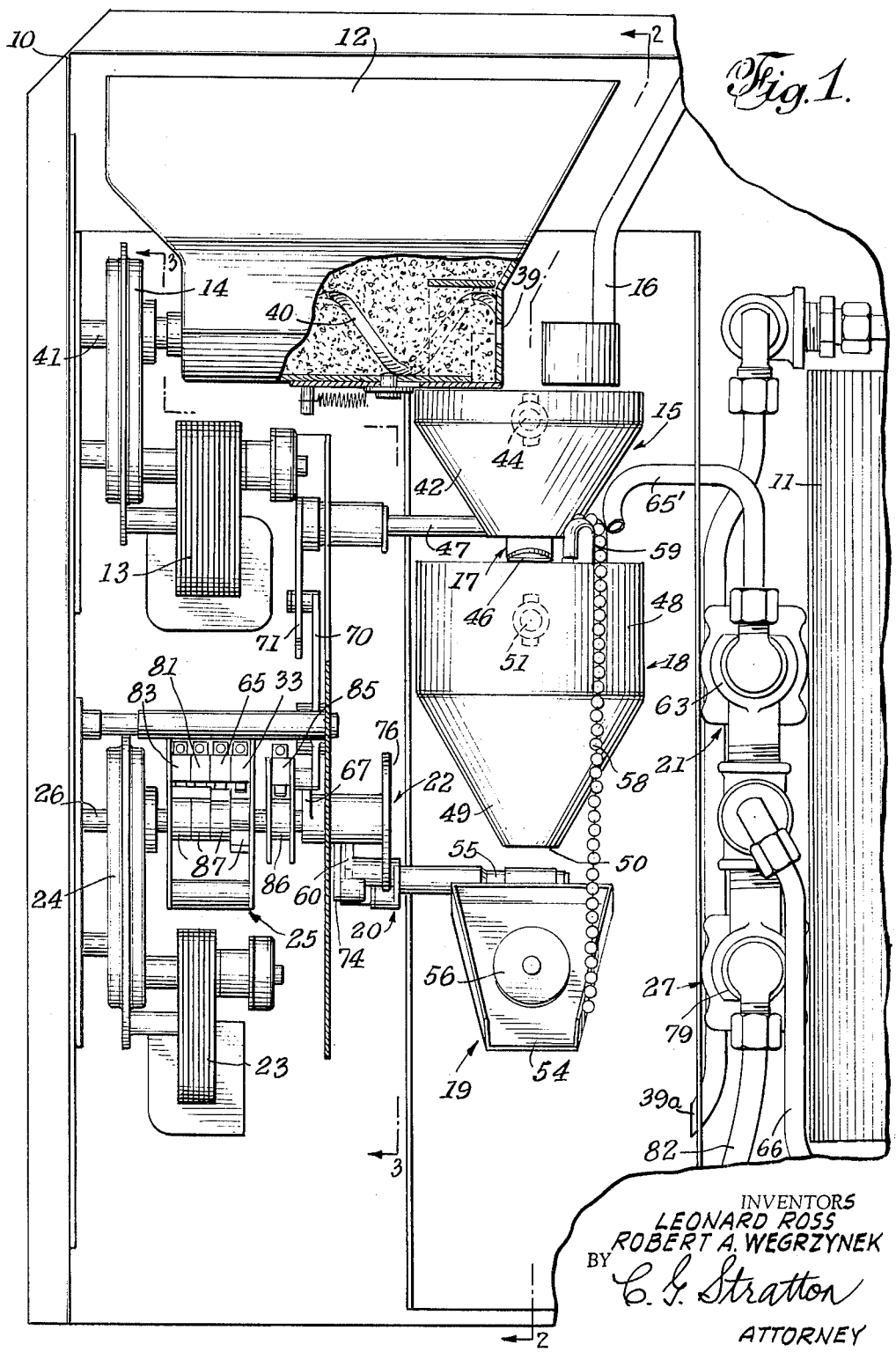

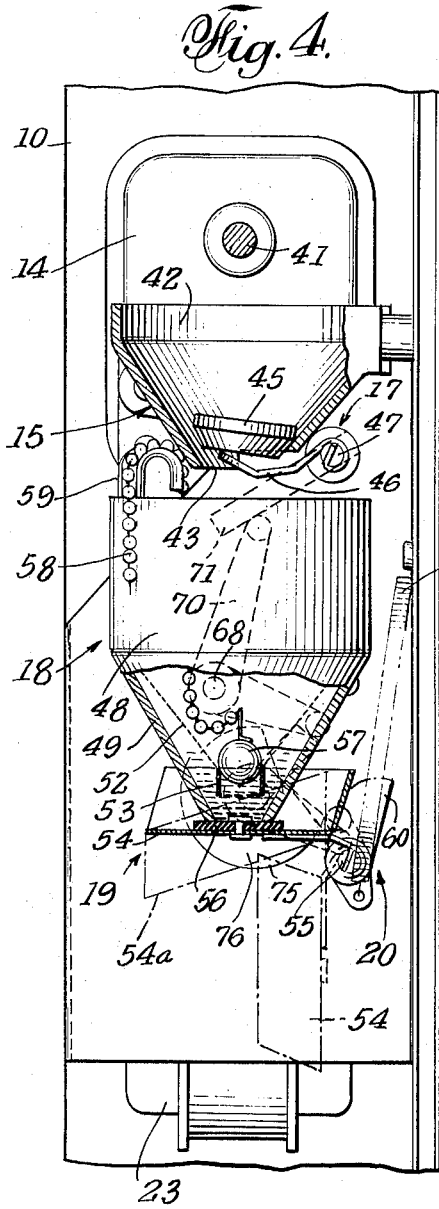

United States Patent Office 3,253,534
Patented May 31, 1966

3,253,534
COFFEE BREWING MACHINE
Leonard Ross, Encino, and Robert A. Wegrzynek, La Crescenta, Calif., assignors to Imperial Coffee Machine Corp., Los Angeles, Calif., a corporation of California
Filed July 19, 1963, Ser. No. 296,303
6 Claims. (Cl. 99—289)

This application relates to a machine for brewing coffee or similar beverage.

An object of the present invention is to provide a machine that, in a matter of approximately twenty seconds, brews a cup of coffee and automatically dispenses the same into a cup or other or receptacle.

Another object of the invention is to provide a machine as above characterized that automatically rinses the container in which the coffee is brewed, after the brewed coffee is dispensed.

A further object of the invention is to provide a coffee brewing machine that provides a measured supply of ground coffee in the system during the brewing and dispensing portions of the cycle of operation such supply remaining in the system preparatory to the next brewing and dispensing cycle and constituting the ground coffee that is brewed during said cycle.

Hence, the present machine contemplates a cycle of operation that simultaneously provides a measured supply of ground coffee for the following cycle during the cycle of operation that brews and dispenses a cup of coffee based on a measured supply previously provided.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts which will more fully appear in the course of the following description and which is based on the accompanying drawings. However, said drawings merely show, and the following description merely describes, one embodiment of the present invention, which is given by way of illustration or example only.

In the drawings, like reference characters designate similar parts in the several views.

FIGURE 1 is a front elevational view of the pertinent portions of a coffee brewing machine according to the present invention and shown in the position of the parts at the end of the cycle of operation.

FIGURES 2 and 3 are vertical sectional views as taken on the respective lines 2—2 and 3—3 of FIGURE 1.

FIGURE 4 is a vertical sectional view on the plane of line 2—2 showing the machine during an intermediate portion or the cycle of operation.

FIGURE 5 is a diagram of the electrical components of the machine immediately after start of the operation.

The coffee brewing machine that is illustrated comprises, generally, a cabinet 10 in which the machine components are housed, a hot water tank 11 disposed in one side of the cabinet and provided with an inlet preferably from a house supply at a desired or regulated pressure, a storage hopper or receptacle 12 for ground coffee, an electric motor 13 for operating the feed of said receptacle through a reducing gear unit 14, primary brew means 15 to receive ground coffee from the receptacle 12 and hot water from the tank 11 through a feed tube 16, means 17 for releasing the contents of the primary brew means 15, secondary brew means 18 for receiving the discharge of the means 15, means 19 to retain the contents of the means 18 during a brewing period, means 20 to operate the means 19 to first open the secondary brew means 18 for discharge or delivery of the brewed coffee while retaining the spent grounds, and then operating the means 19 to open the means 18 to discharge said spent grounds, means 21 providing a cold water rinse for washing said spent grounds out of the secondary brew means 18, mechanical control means 22 for the means 17 and 20, a motor 23 to drive the control means 22 through a reducing gear unit 24, and electrical means 25 driven and controlled by the drive shaft 26 of the means 22 for successively controlling feed of hot brew water to the means 15, rinse water to the means 18 and operation of the ground coffee feed motor 13. The present machine advantageously includes flush water means 27 for flushing discharged spent grounds to sewer disposal, the electrical means 25 controlling the same, operating after the rinse operation and before the coffee motor is operated.

The cabinet 10 is preferably rectangular, as shown, and relatively shallow for convenient home installation as well as in vending machines.

The tank 11 supplies hot water to the feed tube 16, the same being provided by a valve controlling said flow and represented, in the diagram of FIG. 5 by a solenoid 30 that is in series in the line 31 with a starting switch 32, and a normally open switch 33 in the electrical means 25.

The wiring diagram also shows that said tank 11 is provided with a heater 34 that is in series in the line 31 with a thermostat 35 preferably set to keep the hot water in a range of between 170° and 220° F., a high-limit cut-off switch 36 being provided in series with said heater 34 and thermostat 35.

The diagram also shows a switch 37 that is in series, in the line 31, with a solenoid 38 that represents a valve to control hot water flow in a tube 39a. Said switch 37 is pushed only when hot water and not coffee is to be dispensed into a cup or receptacle beneath the means 19, as when in position to receive the brewed contents of the means 16.

The coffee hopper 12 has a discharge opening 39 and is provided with a conventional feed screw 40 that is driven by a shaft 41 from the reducing unit 14 when motor 13 is energized.

The primary brew means 15 is shown as comprising a cup 42 that is preferably of conical form with a discharge opening 43. Said cup is supported from the cabinet by a stud 44 so the same may be removed and replaced for cleansing thereof. A disc valve 45 normally gravitationally closes the opening 43 so that the cup will hold ground coffee, as shown in FIG. 2, and such coffee and a supply of hot water fed from the tube 16, at the beginning of the brewing cycle.

The means 17 is shown as a finger 46 beneath the disc valve 45 and affixed to a shaft 47 that is oscillated by the mechanical control means, later described. The finger 46 is moved from the retracted position of FIG. 2 to the position of FIG. 4 wherein said valve 45 is lifted off its seat to allow the grounds and hot water in cup 42 to fall into the secondary brew means 18.

The latter means. is shown as comprising an outer cup 48 that has a lower conical portion 49 terminating in an opening 50 and which is removably mounted in the cabinet 10 by means of a stud 51, an inner frustoconical foraminous cup 52 provided at its discharge end with a collar 53 providing a grounds-retaining means which will readily pass the water discharged thereinto from the cup 42.

The means 19 comprises an arm 54 on a pivot shaft 55 and provided with a stopper disc 56 that engages and closes the cup opening 50 when said arm 54 is raised to the position of FIG. 4. Said means 19 further comprises a ball valve 57 that, by means of an articulated connection 58, which is trained over a guide shoe 59 at the upper end of the cup 48, is connected to the arm 54. Said articulated connection 58 is of such length as to allow the ball valve 57 to seat on and close the collar 53 only when the arm 54 is in the position of FIG. 4. It will be clear that, when the opening 50 is closed by the stopper disc 56, the collar 53 is also closed. FIG. 4 shows that there is slack in the connection 58 in this condition of the means 19, it being evident that said arm may be moved downwardly through a relatively small angle to open the outer cup 48 for discharge of the liquid contents thereof while the slack is being taken up and the ball 57 remains seated on the collar 53 to present discharge of the grounds contained by the foraminous cup 52. When the arm 54 is dropped to the position of FIG. 2 or to its fully released position according to the dot-dash lines of FIG. 4, the resultant pull on the articulated connection 58 lifts the ball valve 57 off its seat to permit discharge of the coffee grounds in the inner cup 52.

The means 20 is shown as comprising an arm 60 on the shaft 55 that is controlled by the control means 22, hereinafter described, to cause the arm 54 to be raised to the closed position of FIG. 4, an arm 61 on said shaft 55, also controlled by the means 22, to move the arm 54 from its fully dropped position as shown by the dot-dash lines of FIG. 4 to its final at rest position at the end of the cycle of operation, as in FIG. 2, and a spring 62 that acts to cause such a full drop of arm 54 when the arm 60 is released by said operating means 22.

Discharge of the grounds in the foraminous cup 52 is accompanied by a flow of cold rinse water into said cup from above. The means 21 provides such a flow and comprises normally-closed valve 63 that is controlled by a solenoid 64 (FIG. 5) which is in series in the line 33 with a normally-open switch 65 of the means 25. The outlet of said valve 63 is provided with a flow tube 65' that discharges into the top of the cup 52. The cold water inlet to said valve is shown at 66.

The mechanical control means 22 is best seen in FIGS. 1 and 3 and is shown as an arm 67 on the shaft 26 which is driven by the motor 23 through the reducing gear box 24, a bell crank on a pivot 68 and having an arm 69 operatively engaged with the arm 67 and having a second arm 70 operatively engaged with an arm 71 on the shaft 47 of the means 17.

As viewed in FIG. 3, counterclockwise movement of the arm 67, as indicated by the arrow 72, will cause the arm 69 to raise up on pivot 68 and arm 70 to move counterclockwise, also. Such movement of arm 70 will raise the arm 71 against the bias of a spring 73 which rocks shaft 47 in a clockwise direction to lift the finger 46 and the valve disc 45 as hereinbefore described.

Simultaneously with the mentioned movement of the arm 67, an arm 74, on said shaft 26 and operatively engaged with the arm 60 on shaft 55, moves the latter arm in a clockwise direction, against the bias of the spring 62, to turn said shaft and raise the arm 54 from the position of FIG. 2 to the closed position of FIG. 4.

Before the arms 60 and 74 can lose contact with each other as the drive shaft 26 continues to turn, the peripheral dwell 75 of a cam plate 76 on said shaft engages the arm 61, above described, holding the arm 54 in closed position, as in FIG. 4. The length of the dwell 75 determines the brewing time of the material in the means 18. When the lowered dwell 77 of said cam plate reaches the arm 61, the latter is released sufficiently to allow the arm 54 to drop under pull of spring 62 to an angular position, as shown at 54a, in FIG. 4. Therefore, the liquid contents of the outer brew cup 48 may discharge onto the sloping surface of arm 54 and be guided thereby to a spout (not shown) for ultimate discharge into a cup or other receptacle.

As rotation of shaft 26 continues, the corner 78 at the end of the lowered dwell 77 of the cam plate 76 releases the arm 61, completely freeing the same so that the spring 62 may bias the shaft 55 to the fully dropped position of arm 54 as shown in FIG. 4. Then, as the arm 74 re-engages the arm 60, the latter is moved to restore the arm 54 to its final end-of-cycle position, as in FIG. 2.

The water flush means 27 is shown as a valve 79 that is controlled by a solenoid 80 that is in series with the line 33 and a normally-open switch 81 of the electrical means 25, and a flush tube 82 that discharges said valve 79 into the drain entrance where the spent coffee grounds had been discharged. Valve 79 is connected to the cold water inlet 66.

At any time after the hot water in tube 16 is shut off and the primary brew means 15 has operated, as above described, to discharge the contents of cup 42 into the secondary brew means 18 and to close the outlet of said cup, fresh coffee grounds are fed from the hopper 12 into the cup 42 followed by a small amount of hot water from tube 16. The grounds are fed through orifice 39 when a switch 83 of the means 25 is closed to cause energization of the motor 13 followed by a short period during which the switch 33 is again closed to provide cup 42 with a small amount of grounds-wetting hot water. These wetted grounds, shown at 84, remain in the cup 42 after the cycle of operation has terminated. Such wetted grounds may so remain in the cup 42 for several hours and often longer without affecting the coffee flavor. However, after a long period, several days, for instance, the cup of coffee made from said grounds may be discarded, and the successive cups brewed, as above set forth.

The means 25 embodies the mentioned switches 33, 65, 81 and 83, as well as a start-stop, self-closing switch 85 that is normally held open by a cam 86 on the drive shaft 26 but closes, automatically, after the coffee switch 32 is pushed, the latter being of the push button, two-point make type, as is also the hot water switch 37. FIG. 1 shows a set of cams 87 on the shaft 26, one to close each of the switches 33, 65, 81 and 83 in proper sequence during one complete revolution of the shaft 26, at which time the cam 86 will open the limit switch 85 and stop the operation of the machine.

*Résumé of operation*

When the push button switch 32 is closed, the drive motor 23 is energized to drive shaft 26. At the first rotative movement of said shaft, the switch 85 closes to hold the circuit through said motor 23. During the next eight seconds, for instance, the switch 33 is closed energizing the solenoid 30 and opening flow of hot water through tube 16 into the cup 42 to form a solution with the grounds 84 therein. As the cup 42 fills, the means 17 is operated by the mechanical control means 22 to lift the finger 46 and unseat the valve disc 45. Before the solution in the cup 42 is washed down into the cup 48, the means 20 is actuated by said control means to cause the arm 54 to rise so its stopper disc closes the outlet 50 and the ball 57 drops into closing position in the collar 53.

As the brew means 18 receives the coffee solution from the cup 42 the cam controlling the switch 33 acts to open the latter stopping flow of hot water for a short time, about two seconds, for instance. By this time, the means 17 has effected release of the arm 71 allowing the spring 73 to retract the finger 46 to allow the valve disc 45 to automatically close the bottom of the cup 42. Now, the switch 33 is re-closed to re-energize the solenoid 30 for a period of, perhaps one and one-half seconds so that, for instance, one and one-half ounces of hot water may enter the cup 42 and moisten the fresh coffee grounds in said cup. Fresh coffee grounds are fed from hopper 12 into cup 42 through orifice 39 when switch 83 of means 25 is closed to cause energization of motor 13.

The brewing period of the solution in the secondary brewing means 18 begins when the same receives the solution and continues under control of the dwell 75 of the cam disc 76, a period of perhaps thirteen seconds from the start of the cycle of operation. It is then that the arm 54 drops to the position 54a of FIG. 4 allowing the coffee liquid in the cup 48 to be dispensed into a cup or other receptacle.

Then as the arm 54 drops to a pendent position, unseating the ball valve 57, the switch 65 is closed by one of the cams 87 to energize the solenoid 64, open valve 63, and provide a flow of cold rinse water through tube 65' into the inner cup 52 to rinse off the spent grounds in said cap which discharge through the open collar 53. The rinse period may continue for about three seconds. By timing of the shaft 26 to make one revolution in twenty seconds, for instance, a cup of coffee can be brewed during such time, the flushing out of the drain being carried out by about one pint of cold water that may be released by the valve 79 upon energization of the solenoid 80 at the end of the hot water delivery to the primary brewing means 15 and is controlled by the cam 87 which closes switch 81 and then allows the same to open to stop the flush flow before the rinse cycle, above described, starts.

The above-described operation is instituted by depression of the coffee switch 32. Such depression may be normal to provide brewed coffee by the cup, as needed; or any suitable timer device may depress said switch in timed sequence to provide a continuous supply of brewed coffee by the cup to any desired number.

It will be evident that speed up of the brewing time is largely due to the preliminary or primary brewing in the means 15, followed by the secondary brewing in the means 18, the former occurring during the latter period and providing a pre-brewed quantity of coffee grounds that awaits the institution of the brewing cycle.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. In a coffee brewing machine,
   (a) two fixed brewing cups, one below the other,
   (b) means to provide the upper cup with a quantity of wetted fresh coffee grounds,
   (c) a gravity valve to retain said wetted grounds in the cup,
   (d) means to simultaneously open said valve and wash said grounds into the lower cup with a flow of hot water,
   (e) means to release said valve to close the upper cup,
   (f) means to provide said closed upper cup with a replacement quantity of wetted fresh coffee grounds while the grounds washed into the lower cup are brewing,
   (g) said second cup comprising an outer container to receive the brew water, and an inner foraminous container that passes said brew water and intercepts the coffee grounds,
   (h) inter-connected means to control discharge from both said containers, and
   (i) means to operate only the control for the outer container,
   (j) the inter-connected means including an elongated and flexible member.

2. In a coffee brewing machine,
   (a) a fixedly mounted outer container having a bottom dispensing opening,
   (b) an inner foraminous container affixed to the outer container and having a bottom discharge opening above the opening in the outer container,
   (c) means to open and close the opening in the outer container, and
   (d) means connected to the latter means and operated thereby to open and close the opening in the inner container.

3. In a coffee brewing machine,
   (a) a fixedly mounted outer container having a bottom dispensing opening,
   (b) an inner foraminous container affixed to the outer container and having a bottom discharge opening above the opening in the outer container,
   (c) means to open and close the opening in the outer container,
   (d) a valve member to control the opening in the inner container, and
   (e) an articulated and elongated member connecting said opening-controlling means.

4. In a coffee brewing machine according to claim 3, said member being trained over the top of both containers to extend upwardly outside said containers and downwardly inside the foraminous container.

5. A coffee brewing machine comprising:
   (a) primary brewing means to hold a quantity of wetted fresh coffee grounds,
   (b) means to add hot water to said grounds to form a coffee solution,
   (c) secondary brewing means to receive said solution to brew the same and dispense the resulting liquid coffee, said means comprising an outer cup having a bottom dispensing opening, means to control said opening, a foraminous cup within the outer cup for holding the coffee grounds discharged thereinto and to pass the accompanying water to the outer cup, said foraminous cup being provided with a discharge orifice, and a valve member to control said orifice and connected to and operated by the means that controls the dispensing opening in the outer cup.

6. A coffee brewing machine according to claim 5 in which the opening and orifice controlling means are connected by an elongated articulated member that is trained along the outside of the outer cup, over the top thereof and extends downwardly in the inner cup.

References Cited by the Examiner

UNITED STATES PATENTS

| | | | |
|---|---|---|---|
| 709,135 | 9/1902 | Brown | 99—289 |
| 1,551,855 | 9/1925 | Svendsgaard | 99—289 |
| 1,665,728 | 4/1928 | Canright | 99—289 X |
| 2,194,807 | 3/1940 | Oyen | 99—289 |
| 2,313,152 | 3/1943 | Jorgenson | 68—17 X |
| 2,490,634 | 12/1949 | Keene | 68—17 X |
| 3,120,440 | 2/1964 | Ross | 99—289 X |
| 3,171,344 | 3/1965 | Mathieu et al. | 99—283 |

IRVING BUNEVICH, *Primary Examiner.*

LEONARD W. VARNER, ROBERT E. PULFREY, WALTER A. SCHEEL, *Examiners.*

JOSEPH D. BEIN, STANLEY P. FISHER,
*Assistant Examiners.*